Apr. 17, 1923.
P. H. D. WALKER ET AL
1,451,724
QUICK ACTION VISE
Filed June 27, 1922
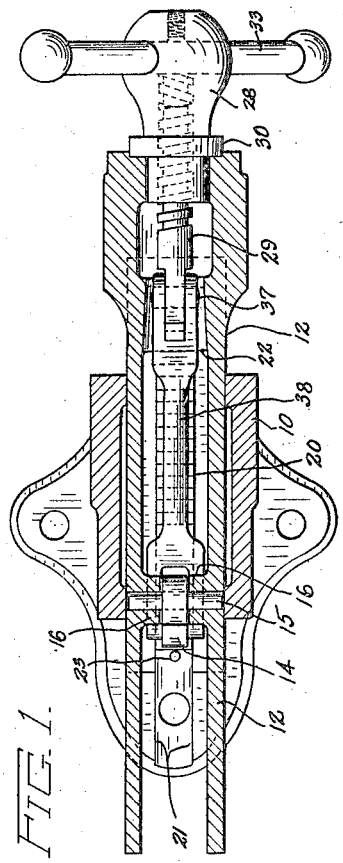
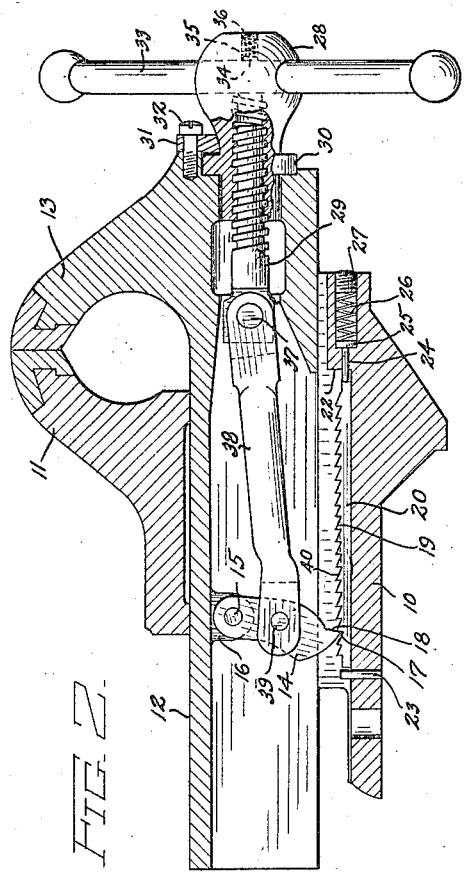
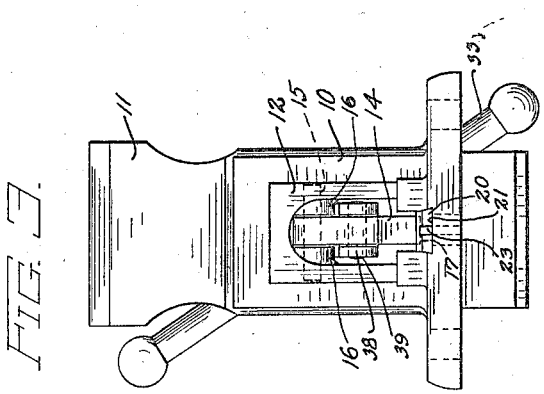
INVENTORS.
Percy H. D. Walker
and Lewis L. Turner
BY Wooster & Davis
ATTORNEYS.

Patented Apr. 17, 1923.

1,451,724

UNITED STATES PATENT OFFICE.

PERCY H. D. WALKER, OF MERIDEN, AND LEWIS L. TURNER, OF SOUTH MERIDEN, CONNECTICUT, ASSIGNORS TO THE CHARLES PARKER COMPANY, OF MERIDEN, CONNECTICUT, A CORPORATION OF CONNECTICUT.

QUICK-ACTION VISE.

Application filed June 27, 1922. Serial No. 571,277.

*To all whom it may concern:*

Be it known that we, (1) PERCY H. D. WALKER and (2) LEWIS L. TURNER, citizens of the United States, residing at (1) Meriden and (2) South Meriden, county of New Haven, State of Connecticut, have invented an Improvement in Quick-Action Vises, of which the following is a specification.

This invention relates to vises and has for an object to provide an improved vise of the so-called quick action type which will be simple in construction, strong, durable, and reliable in operation, and not easily gotten out of order.

With these and other objects in view we have devised the construction illustrated in the accompanying drawing, in which Fig. 1 is a sectional plan view through the device, the plane of section being immediately above the adjusting screw.

Fig. 2 is a longitudinal sectional elevation of the device, and

Fig. 3 is a rear end elevation thereof.

The vise comprises a body member 10 carrying a jaw 11, the body being also provided with guides in which is slidably mounted a slide 12 carrying a second jaw 13 adapted to coact with the first jaw to hold the work in the usual manner. The slide may be of various forms in cross section but we preferably make it of substantially inverted U-shape as shown in Fig. 3 and mount within the same a pawl 14. This pawl is preferably pivoted to the slide by a suitable transverse pin 15 extending through lugs 16 on the slide between which lugs the pawl is located. The pawl is provided with an edge 17 at its lower end with a shoulder 18 adjacent this edge to coact with holding means carried by the body member. This holding means is preferably a series of teeth 19 and they may be made integral with the body member, but we prefer to form them on a separate rack 20 mounted in the body member. This rack may be stationary if desired but in order to insure that the pawl will always properly engage a tooth of the rack in the jaw closing operation, we preferably mount this rack so that it may have a certain amount of movement longitudinally of the slide. With this in view we provide a guide 21 slightly wider at the bottom than at the top, the rack also being slightly wider at the bottom to fit this guide and so prevent accidental displacement thereof. Stops are provided at the opposite ends of the rack such as a shoulder 22 at its forward end and a pin 23 at its rear end. Shoulder 22 limits the forward movement of the rack when the same is engaged by the pawl. Yieldable means is provided tending to move the rack in the opposite direction and hold it in position against the pin 23 when the pawl is disengaged from the rack. This may be any suitable means but we prefer that shown which comprises a pin 24 engaging the forward end of the rack and slidable in a suitable guiding opening in the body member. This pin has an enlarged head 25 engaging a spring 26 held thereagainst by means of a threaded plug 27 which may be removed by means of a screw driver if desired.

Rotatably mounted in the slide is a head 28 which has threaded engagement with a screw 29. This head has a bearing in the slide and has a flange 30 guided between the slide and a saddle 31 secured to the slide by the saddle screw 32 to retain the head in the slide. The usual bar 33 extends transversely through the head for turning the same, this bar being slidable in the head and preferably yieldingly held in any given position by means of a plug 34 pressed against the side of the bar by means of a spring 35 held between the head and the screw plug 36. The other end of the screw 29 is pivoted by means of a pin 37 to a link 38 which is pivoted at its other end as indicated at 39 to the pawl 14, so that reciprocation of the screw under the turning action of the head will move the pawl to and from engagement with the rack 20 and either release or close the jaws. In the claims we have used the term "close the jaws" but we do not mean by this that the jaws are necessarily actually brought in contact but intend this term to cover the action of drawing the jaws toward each other to grip the work whether they actually come in contact or not.

The operation is as follows:

By rotating the head 28 to the left the screw 29 will be moved to the rear, swinging the pawl to the rear on its pivot and moving the lower edge and shoulder 18 out of engagement with the rack. It will be apparent that now the slide 12 with its jaw may be slid within the body member to any desired position without further turning movement of the head. The work may then be placed between the jaws and the slide moved inwardly to engage its jaw with the work. Then by rotating the head 28 to the right the screw 29 will be drawn into the head and through the link 38 will bring the shoulder 18 of the pawl against a tooth of the rack. If this rack were stationary and rigid, in some locations of the slide the lower edge of the pawl might engage on the incline indicated at 40 of a tooth, and if it did not slide down this incline further tightening of the screw would bind the edge of the pawl against this incline and might interfer with the proper closing of the vise or rupture the pawl. To obviate this difficulty and to insure that the pawl will always operate properly and not bind, the rack is mounted as described above to be allowed a certain amount of forward movement. It will, therefore, be apparent that, as the lower edge of the pawl is first brought into engagement with a tooth of the rack under the action of the screw 29, the spring 26 will yield and allow the rack to move forwardly until the forward end thereof engages the shoulder 22 and the shoulder 18 of the pawl is properly positioned against a shoulder of the tooth. Now upon further rotation of the head 28 the reaction of the pawl on the rack will draw the slide rearwardly and its jaw tightly against the work securely clamping the same in position. Rotation of the head 28 in the opposite direction will release the pawl and allow movement of the jaw as above described. If the threads on the screw 29 are of relatively deep pitch it will be apparent that the act of releasing and clamping the slide may be accomplished with a very few number of turns of the head. It will also be apparent that the device has few parts and is very simple in construction, and so will be reliable and efficient in operation and not easily gotten out of order.

Having thus described the nature of our invention, what we claim is:

1. A vise comprising a body having a jaw, a slide guided in said body and provided with a jaw, a movable rack carried by the body, means carried by the slide to engage the rack and movable to and from engagement therewith, means carried by the slide to cause said rack engaging means to coact with the rack to close the jaws, means to limit the movement of the rack under said coaction, and yielding means tending to move the rack in the opposite direction.

2. A vise comprising a body having a jaw, a slide guided in said body and provided with a jaw, a movable rack carried by the body, a pivoted pawl carried by the slide and adapted to engage said rack, means carried by the slide to cause said pawl to coact with the rack to close the jaws, means to limit the movement of the rack under said coaction, and yielding means tending to move the rack in the opposite direction.

3. A vise comprising a body having a jaw, a slide guided in said body and provided with a jaw, a pawl carried by said slide, means carried by the body adapted to coact with said pawl, and means carried by the slide for moving the pawl to and from engagement with said first mentioned means and also cause the same to coact to close the jaws or release the same, said second mentioned means comprising a rotatable head, a screw element having threaded engagement with said head, and means connecting said screw element with the pawl.

4. A vise comprising a body having a jaw, a slide guided in said body and provided with a jaw, a pawl carried by said slide, a toothed rack carried by said body, and means carried by the slide to move the pawl to and from engagement with said rack, said means being also arranged to cause them to coact to close the jaws or to release the same and comprising a rotatable head, a screw element having threaded engagement with said head, and means connecting the screw element with the pawl.

5. A vise comprising a body having a jaw, a slide guided in said body and provided with a jaw, a pawl carried by said slide, a movable rack carried by said body, means carried by the slide to move the pawl to and from engagement with said rack to cause them to coact to close the jaws or to release the same, means to limit the movement of the rack under said coaction, and a spring tending to move said rack in the opposite direction.

6. A vise comprising a body having a jaw, a slide guided in said body and provided with a jaw, a toothed rack carried by the body, a pawl pivoted to said slide and adapted to engage said rack, a rotatable head carried by said slide, a screw longitudinally movable in said slide and having threaded engagement with said head, and means to connect said screw with said pawl whereby the pawl may be moved to and from engagement with said rack and the jaws closed and released.

7. A vise comprising a body having a jaw, a slide guided in said body and provided with a jaw, a movable rack carried by the body, a pawl pivoted to the slide and adapted to engage said rack, a rotatable head carried by said slide, a screw having threaded engagement with said head, means to connect said screw with said pawl whereby the pawl may be moved to and from engagement with said rack, means to limit the movement of the rack under the action of said pawl, and a spring tending to move the rack in the opposite direction.

8. A vise comprising a body having a jaw, a slide guided in said body and provided with a jaw, a toothed rack carried by the body, a pawl pivoted to the slide and adapted to engage said rack, a rotatable head carried by the slide, a longitudinally movable screw having threaded engagement with said head whereby rotation of the head will move the screw longitudinally of its axis, a link pivoted to the screw and pawl, and means for rotating the head.

9. A vise comprising a body having a jaw, a slide guided in said body and provided with a jaw, a movable rack carried by the body, a pawl pivoted to the slide and adapted to engage said rack, a rotatable head carried by the slide, a longitudinally movable screw having threaded engagement with said head whereby rotation of the head will move the screw longitudinally of its axis, a link pivoted to the screw and pawl and adapted to move the pawl to and from engagement with the rack, means for limiting the movement of the rack under action of the pawl, a spring tending to move the rack in the opposite direction, and means for rotating the head.

In testimony whereof we affix our signatures.

PERCY H. D. WALKER.
LEWIS L. TURNER.